United States Patent [19]

Chen

[11] Patent Number: 4,822,864
[45] Date of Patent: Apr. 18, 1989

[54] GAS PERMEABLE CONTACT LENS AND METHOD AND MATERIALS FOR ITS MANUFACTURE

[75] Inventor: Richard Y. S. Chen, Raleigh, N.C.

[73] Assignee: Ocular Technologies, Inc., Raleigh, N.C.

[21] Appl. No.: 241,190

[22] Filed: Sep. 7, 1988

Related U.S. Application Data

[63] Continuation of Ser. No. 63,312, Jun. 18, 1987.

[51] Int. Cl.⁴ .............................................. C08F 30/08
[52] U.S. Cl. .................. 526/279; 351/160 R; 523/107; 525/100; 528/32
[58] Field of Search .................. 523/107; 525/100; 351/160 R; 526/279; 528/32

[56] References Cited

U.S. PATENT DOCUMENTS

| | | | |
|---|---|---|---|
| 4,297,310 | 10/1981 | Akutsu et al. | 526/279 |
| 4,446,283 | 5/1984 | Doi et al. | 526/279 |
| 4,525,563 | 6/1985 | Shibata et al. | 526/279 |
| 4,581,184 | 4/1986 | Powell | 526/271 |
| 4,594,401 | 6/1986 | Takahashi et al. | 526/279 |
| 4,602,074 | 7/1986 | Mizertani et al. | 526/279 |
| 4,611,039 | 9/1986 | Powell et al. | 526/279 |
| 4,616,045 | 10/1986 | Upchurch | 526/279 |
| 4,625,006 | 11/1986 | Bernhardt et al. | 526/279 |
| 4,625,007 | 11/1986 | Ellis | 526/279 |
| 4,632,968 | 12/1986 | Yokota | 526/279 |
| 4,689,369 | 8/1987 | Ishino | 526/279 |
| 4,758,640 | 7/1988 | Fujimoto et al. | 526/279 |
| 4,770,968 | 9/1988 | Georges et al. | 526/279 |
| 4,780,510 | 10/1988 | Uemiya et al. | 526/279 |
| 4,780,515 | 10/1988 | Deichert | 526/279 |

*Primary Examiner*—Morton Foelak
*Attorney, Agent, or Firm*—Lewis H. Eslinger

[57] ABSTRACT

A polymer is prepared by forming a mixture of 3-methacryloxypropytris(trimethylsiloxy) silane, methacrylic acid, cyclohexylmethacrylate, 2-hydroxypropylmethacrylate, m,p-styrylethyltrimethoxysilane, methyl methacrylate and a cross linker. A polymerization initiator is added to the mixture, and UV or thermal energy is supplied so that the mixture polymerizes to form a polymer that is transparent, hard, machinable and oxygen permeable. The polymer is cut into lenses, and the lenses are treated with acetyl chloride or another suitable chemical so that their surfaces become hydrophilic. The result is oxygen-permeable, hydrophilic, daily and extended-wear, hard contact lenses.

2 Claims, 1 Drawing Sheet

GAS PERMEABLE CONTACT LENS AND METHOD AND MATERIALS FOR ITS MANUFACTURE

This is a division of application Ser. No. 063,312, filed June 18, 1987.

BACKGROUND OF THE INVENTION

1. Field of the Invention

This invention relates to contact lenses and, more particularly, to a novel and highly-effective daily-wear and extended-wear contact lens and to a method and material for its manufacture.

2. Description of the Prior Art

There is a great need for a contact lens that can be worn safely, comfortably and continuously for an extended time, for example one or two months, and that is inexpensive enough to be discarded after that time. It is essential that such a lens be highly oxygen permeable, since the pupil of the eye has no blood circulation and extracts the oxygen needed by its cells directly from the atmosphere. Ideally, such a lens should be hard so that it can correct for astigmatism. In order to be comfortable for the wearer, however, the lens must also be hydrophilic; that is, the contact angle of an air-water interface with a surface of the lens must be small.

In conventional practice, measures taken to increase oxygen permeability increase contact angle, so that the lens becomes uncomfortable, and measures taken to reduce contact angle reduce oxygen permeability, so that the lens cannot be worn continuously for an extended period. This trade-off has thus far defeated efforts to produce an extended-wear contact lens having all of the desired properties.

OBJECTS AND SUMMARY OF THE INVENTION

An object of the invention is to remedy the problems outlined above and in particular to provide a novel, oxygen-permeable, hydrophilic, extended-wear, hard contact lens and a method and easily-machinable inexpensive material for its manufacture.

In accordance with one aspect of the invention, a method of making a plastic material for a contact lens comprises the steps of:

A mixture is prepared comprising initiators and at least one polymerizable silicone monomer selected from the group consisting of

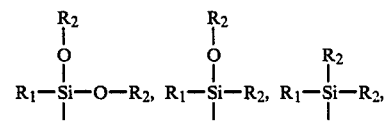

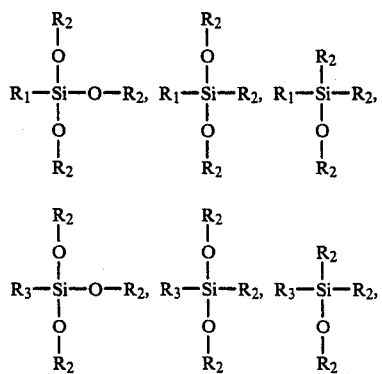

-continued

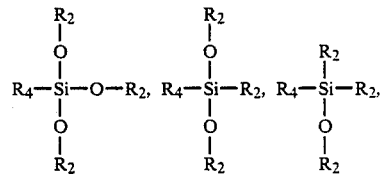

and mixtures thereof, where $R_1$ is selected from the group consisting of

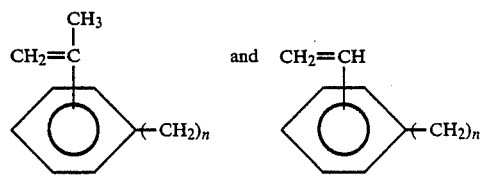

where $n = 1$ to 6, and mixtures thereof, $R_2$ is selected from the group consisting of an alkyl group having form 1 to 8 carbon atoms, a saturated cyclic group and a benzene ring, and mixtures thereof, $R_3$ is selected from the group consisting of

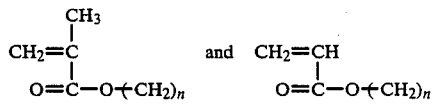

where $n = 1$ to 6, and mixtures thereof, and $R_4$ is selected from the group consisting of

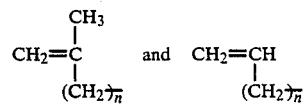

where $n = 1$ to 6, and mixtures thereof.

Energy is supplied to the mixture so that the mixture polymerizes to form a polymer that is transparent, hard, machinable and oxygen permeable.

In accordance with a second aspect of the invention, a polymer for making a contact lens comprises 0% to 30% by weight of a hydrophilic agent, 0.1% to 5% by weight of a cross linker, 0.05% to 1.0% by weight of a polymerization initiator, and 2% to 94.85% by weight of at least one polymerizable silicone monomer selected from the group consisting of

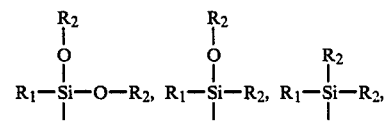

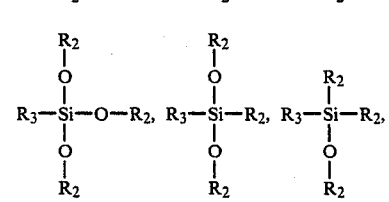

-continued

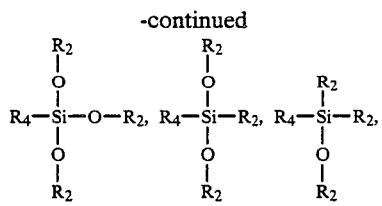

and mixtures thereof, where
R₁ is selected from the group consisting of

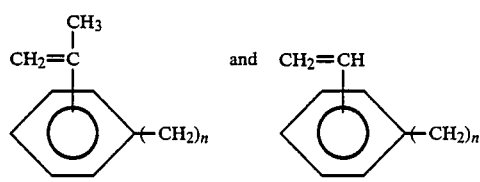

when n=1 to 6, and mixtures thereof,
R₂ is selected from the group consisting of an alkyl group having from 1 to 8 carbon atoms, a saturated cyclic group and a benzene ring, and mixtures thereof,
R₃ is selected from the group consisting of

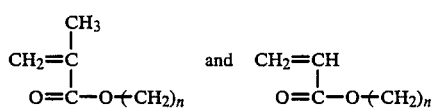

where n=1 to 6, and mixtures thereof, and
R₄ is selected form the group consisting of

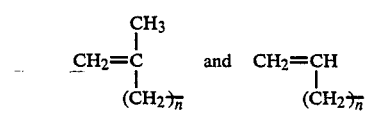

where n=1 to 6, and mixtures thereof,
the polymer being transparent, hard, machinable and oxygen permeable.

In accordance with a third aspect of the invention, a contact lens is made of a polymer comprising 0% to 30% by weight of a hydrophilic agent, 0.1% to 5% by weight of a cross linker, 0.05% to 1.0% by weight of a polymerization initiator, and 2% to 94.85% by weight of a polymerizable silicone monomer selected from the group consisting of

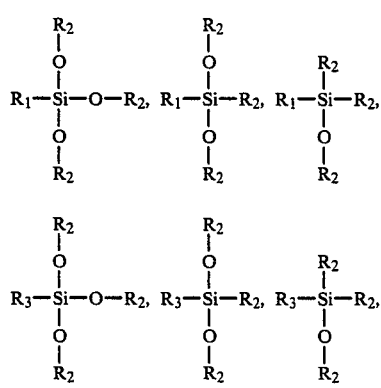

-continued

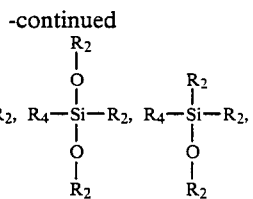

and mixtures thereof, where
R₁ is selected from the group consisting of

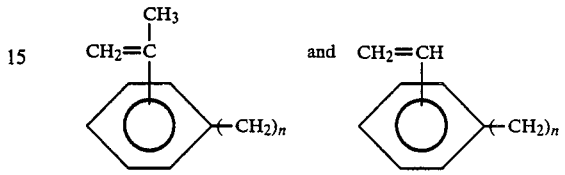

when n=1 to 6, and mixtures thereof,
R₂ is selected from the group consisting of an alkyl group having from 1 to 8 carbon atoms, a saturated cyclic group and a benzene ring, and mixtures thereof,
R₃ is selected from the group consisting of

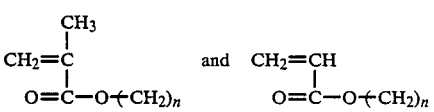

where n=1 to 6, and mixtures thereof, and
R₄ is selected from the group consisting of

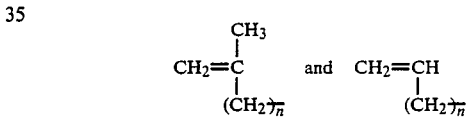

where n=1 to 6, and mixtures thereof, the lens being transparent, hard, machinable and oxygen permeable.

BRIEF DESCRIPTION OF THE DRAWING

A better understanding of the objects, features, and advantages of the invention can be gained from the following description of the preferred embodiments thereof, in conjunction with the appended figures of the drawings, wherein.

DESCRIPTION OF THE PREFERRED EMBODIMENTS

Figure 1:
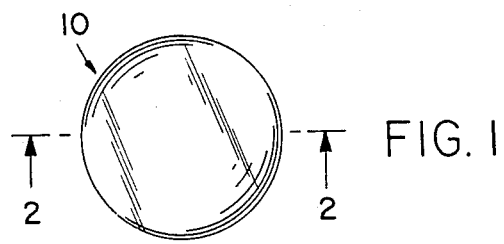
FIG. 1 is a plan view of a contact lens constructed in accordance with the invention.
Figure 2:
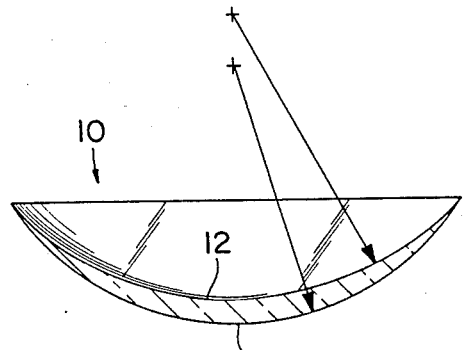
FIG. 2 is a sectional view taken along the line 2—2 of FIG. 1 and looking in the direction of the arrows.

FIGS. 1 and 2 show a contact lens 10 made in accordance with the invention. The lens 10 comprises an inner surface 12 ("base curve") that makes contact with the eyeball of the wearer so that it covers at least the pupil and an outer surface 14 that is intermittently wiped or covered by the eyelid. The lens 10 is curved to conform substantially to the shape of the portion of the eyeball covered by the lens and may be thicker at the center than at the edges ("convex"), as shown, to improve vision at close distances or thicker at the edges than at the center ("concave") to improve vision at long distances. If the lens is hard and formed with spherical surfaces, it automatically corrects for astigmatism as well as nearsightedness or farsightedness to the extent that the astigmatism is due to nonspherical curvature of the front of the eyeball.

Figure 3:
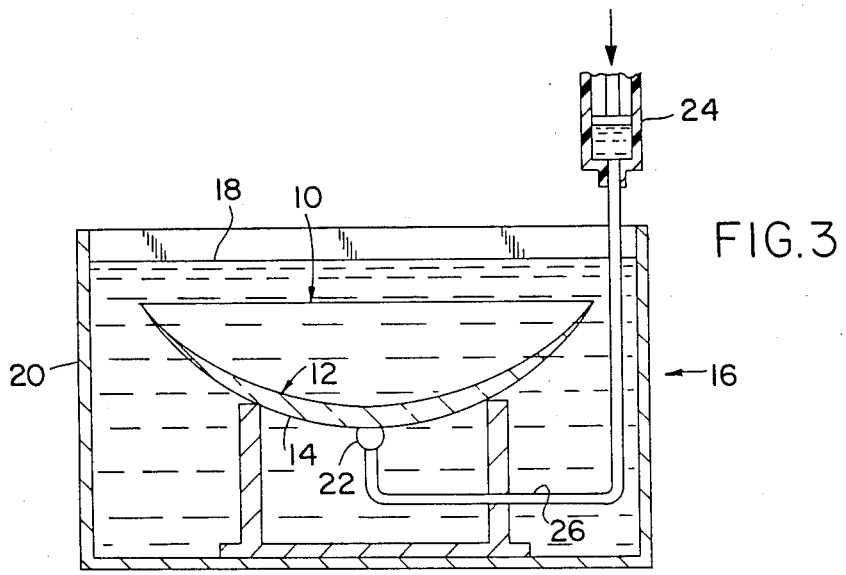
FIG. 3 is a sectional view in elevation illustrating apparatus for measuring the contact angle of an air-water interface with a surface of a contact lens.

FIG. 3 shows apparatus 16 for measuring the contact angle of an air-water interface with a surface of a contact lens. In this case, the lens 10 is submerged in water (or preferably normal saline) 18 contained in a vessel 20, and an air bubble 22 is introduced by a syringe 24 provided with a long, curved needle 26 so that the air bubble 22 is trapped below the lower surface 14 of the lens. It is also possible to place a drop of water (or preferably normal saline) on a lens in air, and to measure the contact angle through the drop of water. The method illustrated is preferred, however, since it measures the contact angle of the lens when the lens is hydrated and therefore more nearly duplicates the conditions that prevail when the lens is in place in the eye.

Figure 4:
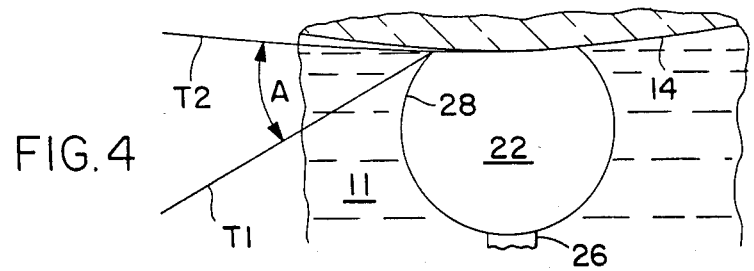
FIG. 4 is an enlarged view illustrating the contact angle.

In either case, an air-water interface 28 forms a contact angle A (FIG. 4) with the lens surface. The contact angle A is measured through the water or normal saline 18 and is defined by tangents T1 and T2 to the air bubble 22 and to the surface 14 of the lens, respectively. The tangents T1 and T2 are taken at the intersection of the air bubble 22 and the surface 14 of the lens. If the angle A is large, for example 60° or more, it indicates that the surface is relatively hydrophobic, like the waxed finish of a car on which raindrops form into beads. A contact lens having a hydrophobic surface is uncomfortable for the wearer. On the other hand, if the contact angle A is small, for example 25° or less, it indicates that the surface is relatively hydrophilic. A contact lens having a hydrophilic surface is much more comfortable for the wearer.

In accordance with the invention, a plastic material for making a contact lens is prepared by forming a mixture comprising 0% to 30% by weight of a hydrophilic agent, 0.1% to 5% by weight of a cross linker, 0.05% to 1.0% by weight of a polymerization initiator, and 2% to 94.85% by weight of at least one polymerizable silicone monomer selected from the group consisting of

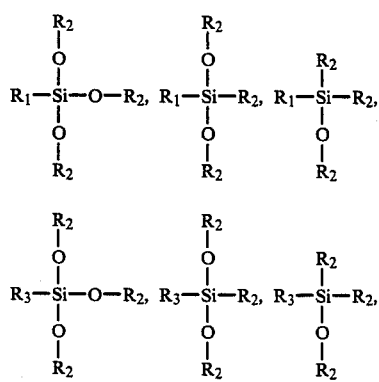

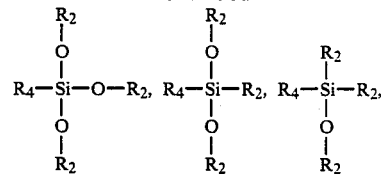

and mixtures thereof, where $R_1$ is selected from the group consisting of

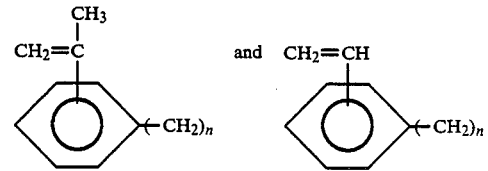

when $n = 1$ to 6, and mixtures thereof, $R_2$ is selected from the group consisting of an alkyl group having from 1 to 8 carbon atoms, a saturated cyclic group and a benzene ring, and mixtures thereof, $R_3$ is selected from the group consisting of

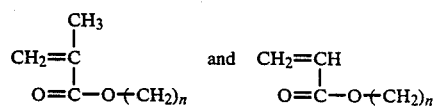

where $n = 1$ to 6, and mixtures thereof, and $R_4$ is selected from the group consisting of

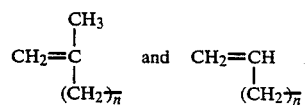

where $n = 1$ to 6, and mixtures thereof; and supplying energy to the mixture so that the mixture polymerizes to form a polymer that is transparent, hard, machinable and oxygen permeable.

Energy is supplied to the mixture so that the mixture polymerizes to form a polymer that is transparent, hard, machinable and oxygen permeable. The polymerization temperature is within a range of 30° C. to 70° C. The time for polymerization to be completed using heat energy ranges from 48 hours (at 30° C.) to 30 minutes (at 70° C.). Polymerization may be completed at room temperature in 30 minutes to one hour using ultraviolet radiation.

The polymerizable material is preferably m,p-styrylethyltrimethoxysilane or S1588, and the cross linker is preferably ethyleneglycoldimethacrylate or EGDMA.

The polymerization initiator is selected from the group consisting essentially of 2,2'-azobis(2,4-dimethylvaleronitrile) or VAZ052, benzoinmethylether or BME, and sec-butylperoxydicarbonate or SBC. The first initiator may be used when polymerization is aided by ultraviolet or thermal radiation, the second when polymerization is aided by ultraviolet radiation, and the third when polymerization is aided by thermal radiation. The polymerization initiator is present in the mixture in an amount ranging from 0.05% to 0.5% by weight.

The cross linker is selected from the group consisting of ethylene glycoldimethacrylate, diethyleneglycoldimethacrylate, tetraethyleneglycoldimethacrylate, silicone containing cross linkers, and mixtures thereof.

Energy is supplied in the form of thermal energy or in the form of ultraviolet radiation, as may be appropriate in view of the initiator employed.

Preferably the mixture comprises substantially 50% by weight of 3-methacryloxypropytris(trimethylsiloxy)silane or OTC1, substantially 8% by weight of methacrylic acid or MA, substantially 7% by weight of cyclohexylmethacrylate or CHMA, substantially 5% by weight of 2-hydroxypropylmethacrylate or 2-HPMA, substantially 15% by weight of m,p-styrylethyltrimethoxysilane or S1588, substantially 14% by weight of methyl methacrylate or MMA, and substantially 1% by weight of ethyleneglycoldimethacrylate or EGDMA.

The method further comprises the steps of forming the polymer into a contact lens and treating a surface of the contact lens with a chemical to reduce the contact angle of an air-water interface with the surface of the lens. The chemical is preferably selected from the group consisting essentially of NaOH, AcCl, and $H_2SO_4$.

Thus the polymer for making the contact lens comprises the same constituents in the same proportions as the mixture described above. The resulting lens also comprises the same materials in the same proportions.

Before the treatment to hydrophilize the surfaces of the lens, the polymer in one embodiment of the invention (employing S1588) may be represented as

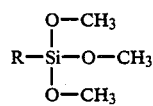

where R is

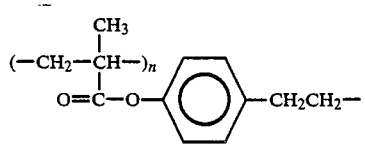

Treatment with 5% by weight $H_2SO_4$ in 95% by weight of $H_2O$ for one hour yields a mixture of

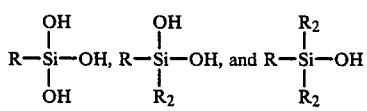

on the surfaces of the contact lens and evolves $CH_4$ as a gas. The resulting lens has a shore hardness (D scale) within the range of 80 to 90. Oxygen permeability in ml cm/cm$^2$ sec cmHg $\times 10^{-10}$ is shown in the second two columns of Table I (normal eye temperature is about 35° C.).

TABLE I

| lens center thickness (mm) | 25° C. | 35° C. |
|---|---|---|
| .125 | 40.9 | 51.8 |
| .157 | 43.5 | 57.7 |
| .215 | 45.0 | 60.2 |
| .295 | 47.1 | 64.4 |

Contact angle is shown in Table 2.

TABLE II

| Before surface treatment | In saline for 48 hrs | After surface treatment with 2N NaOH for 20 minutes and saline for 48 hrs | After surface treatment with 25% AcCl for 20 minutes |
|---|---|---|---|
| 31°–60° | 11°–65° | 12°–25° | 15° |

Light transmission is 97+%, specific gravity is about 1.09, and refractive index is about 1.47.

Before the treatment to hydrophilize the surfaces of the lens, the polymer in another embodiment of the invention (employing T3633) may be represented as

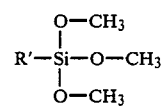

where R' is

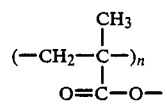

Treatment with 5% by weight $H_2SO_4$ in 95% by weight of $H_2O$ for one hour yields:

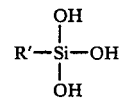

on the surfaces of the contact lens and evolves $CH_4$ as a gas. The resulting lens has a shore hardness (D scale) within the range of 80 to 90. Oxygen permeability and contact angle are close to the values set forth in Tables I and II for lenses made from a polymer employing S1588. Light transmission is 97+%, specific gravity about 1.09, and refractive index is about 1.47. The material is however more brittle than that made with S1588.

EXAMPLE I

The following are mixed at 70° C. in a 100 ml beaker:

| | |
|---|---|
| 3-methacyloxypropytris(trimethylsiloxy)silane or OTC1 | 5.0 grams |
| methacrylic acid or MA | .8 grams |
| cyclohexylmethacrylate or CHMA | .7 grams |
| 2-hydroxypropylmethacrylate or 2-HPMA | .5 grams |
| m,p-styrylethyltrimethoxysilane or S1588 | 1.5 grams |
| methyl methacrylate or MMA | 1.4 grams |
| ethyleneglycoldimethacrylate or EGDMA | .1 grams |

The ethyleneglycoldimethacrylate or EGDMA serves as a cross linker. As an initiator 0.02 grams of 2,2'-azobis(2,4-dimethylvaleronitrile) or VAZ052 is added to the mixture, and the mixture while at room temperature is subjected to ultraviolet radiation from a 20-watt ultraviolet lamp placed at a distance of approximately 20 cm from the mixture. The mixture polymerizes within 30 minutes to form a hard polymer. The polymer is easily cut to the shape of a contact lens having a center thickness of 0.2 mm or less and polished.

The lens is highly transparent and has uniform optical properties. It has an oxygen permeability of $58.6 \times 10^{-10}$ ml cm/cm² sec cmHg at 35° C. The lens is subjected to a surface treatment with 25% acCl for 20 minutes and is found to have a contact angle of 8°.

The following examples are similar to Example I but illustrate variations of the materials and the quantities thereof employed.

EXAMPLE II

| | |
|---|---|
| OTC1 | 32 grams |
| MA | 4 grams |
| 2-HPMA | 2.6 grams |
| T-3633 | 10 grams |
| EDGMA | 1.42 grams |
| azobisisobutyronitrile or AIBN | 0.3 grams |

EXAMPLE III

| | |
|---|---|
| OTC1 | 3.08 grams |
| MA | 0.39 grams |
| CHMA | 0.34 grams |
| 2-HPMA | 0.24 grams |
| S-1588 | 1.00 grams |
| AIBN | 0.03 grams |

EXAMPLE IV

| | |
|---|---|
| OTC1 | 2.9 grams |
| MA | 0.4 grams |
| CHMA | 0.35 grams |
| 2-HPMA | 0.25 grams |
| S-1588 | 0.53 grams |
| T-3633 | 0.51 grams |
| EGDMA | 0.10 grams |
| AIBN | 0.03 grams |

EXAMPLE V

| | |
|---|---|
| OTC1 | 2.9 grams |
| MA | 0.4 grams |
| CHMA | 0.35 grams |
| 2-HPMA | 0.25 grams |
| S-1588 | 0.25 grams |
| T-3633 | 0.75 grams |
| EGDMA | 0.10 grams |
| AIBN | 0.03 grams |

EXAMPLE VI

| | |
|---|---|
| OTC1 | 2.5 grams |
| MA | 0.4 grams |
| 2-HPMA | 0.25 grams |
| MMA | 0.75 grams |
| S-1588 | 0.26 grams |
| T-3633 | 0.75 grams |
| EGDMA | 0.10 grams |
| AIBN | 0.03 grams |

EXAMPLE VII

| | |
|---|---|
| OTC1 | 2.5 grams |
| MA | 0.39 grams |
| CHMA | 0.35 grams |
| 2-HPMA | 0.25 grams |
| MMA | 0.70 grams |
| S-1588 | 0.75 grams |
| EGDMA | 0.05 grams |
| AIBN | 0.03 grams |

EXAMPLE VIII

| | |
|---|---|
| OTC1 | 2.50 grams |
| MA | 0.40 grams |
| CHMA | 0.35 grams |
| Isoborylmethacrylate | 0.70 grams |
| S-1588 | 0.75 grams |
| EGDMA | 0.05 grams |
| 2-HPMA | 0.25 grams |
| AIBN | 0.03 grams |

Thus there is provided in accordance with the invention a novel, disposable, extended-wear, oxygen-permeable, hydrophilic, inexpensive, hard contact lens and a method and easily machinable material for its manufacture. Many modifications of the preferred embodiments of the invention disclosed above will readily occur to those skilled in the art upon consideration of this disclosure. For example, initiators and surface-treatment chemicals other than the ones disclosed may be employed, the contact lens may be tinted or clear, the temperatures and times of polymerization may vary, etc. Accordingly, the invention is not limited except by the appended claims.

I claim:

1. A polymer for making contact lens characterized in that it comprises 0% to 30% by weight of a hydrophilic agent, 0.1% to 5% by weight of a cross linker selected from the group consisting of ethyleneglycoldimethacrylate, diethyleneglycoldimethacrylate, triethyleneglycoldimethacrylate, tetraethyleneglycoldimethacrylate, silicone containing cross linkers, and mixtures thereof, 0.05% to 1% by weight of a polymerization initiator, and 2% to 94.85% by weight of at least one polymerizable silicone monomer selected from the group consisting of

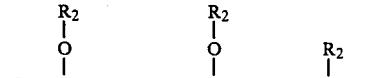

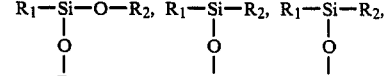

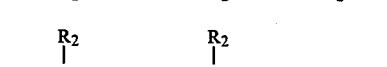

and mixtures thereof, where $R_1$ is selected from the group consisting of

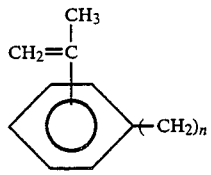 and 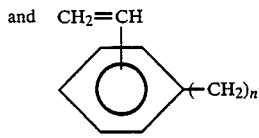

where n=1 to 6, and mixtures thereof, $R_2$ is selected from the group consisting of an alkyl group having from 1 to 8 carbon atoms, a saturated cyclic group and a benzene ring, and mixtures thereof, $R_3$ is selected from the group consisting of

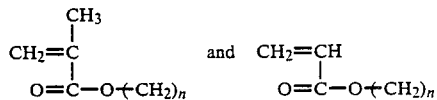

where n=1 to 6, and mixtures thereof, and
$R_4$ is selected from the group consisting of

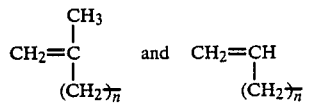

where n=1 to 6, and mixtures thereof,
and in that said polymer transparent, hard, machinable and oxygen permeable.

2. A polymer according to claim 1 characterized in that said polymerizable monomer is p-styrylethyltrimethoxysilane.

* * * * *